(No Model.) 2 Sheets—Sheet 1.

C. SULLIVAN.
SPEED GEARING FOR VELOCIPEDES.

No. 510,101. Patented Dec. 5, 1893.

Witnesses
Oscar A. Michel
N. A. Allen

Inventor:
Cornelius Sullivan
By Drake & Co. Atty's

THE NATIONAL LITHOGRAPHING COMPANY,
WASHINGTON, D. C.

(No Model.) 2 Sheets—Sheet 2.

C. SULLIVAN.
SPEED GEARING FOR VELOCIPEDES.

No. 510,101. Patented Dec. 5, 1893.

Witnesses
Oscar A. Michel
A. A. Allen

Inventor
Cornelius Sullivan,
By Drake & Co. Atty's.

UNITED STATES PATENT OFFICE.

CORNELIUS SULLIVAN, OF NEWARK, NEW JERSEY.

SPEED-GEARING FOR VELOCIPEDES.

SPECIFICATION forming part of Letters Patent No. 510,101, dated December 5, 1893.

Application filed June 13, 1892. Serial No. 436,480. (No model.)

*To all whom it may concern:*

Be it known that I, CORNELIUS SULLIVAN, a citizen of the United States, residing at Newark, in the county of Essex and State of New Jersey, have invented certain new and useful Improvements in Speed-Gearing for Velocipedes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure increased speed in velocipedes now in use, the invention being applicable to most of the ordinary vehicles of this class without materially modifying or changing the construction of the same.

The invention consists in the improved speeding attachment for velocipedes and in the arrangements and combinations of parts, all substantially as will be hereinafter set forth and finally embraced in the clauses of the claim.

Figure 1:
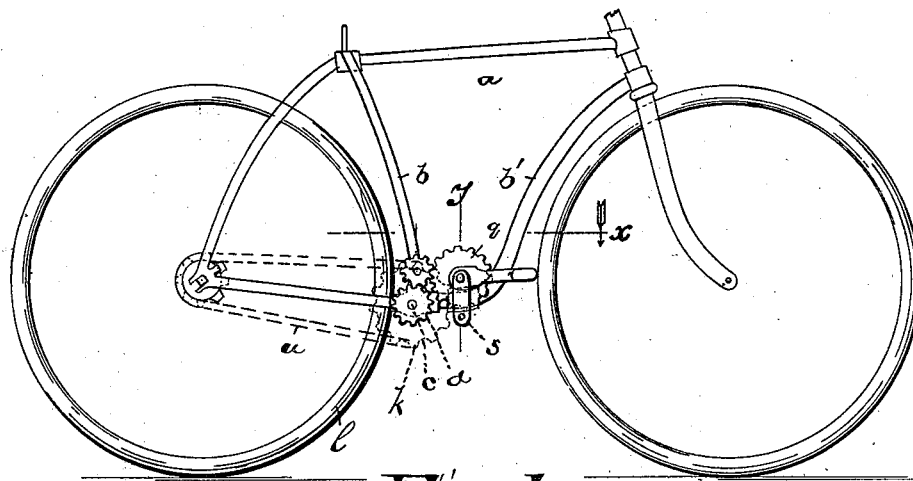
Figure 2:
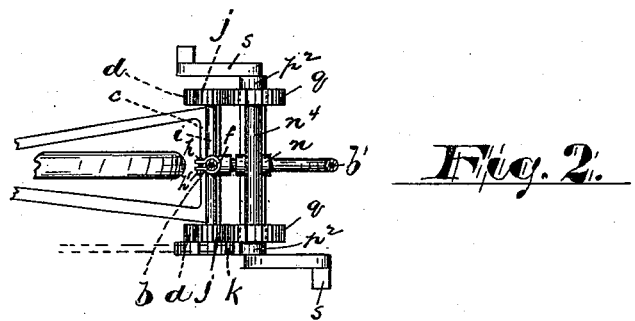
Figure 4:
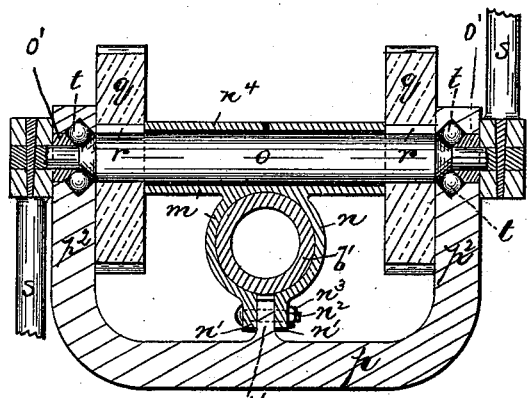
Figure 5:
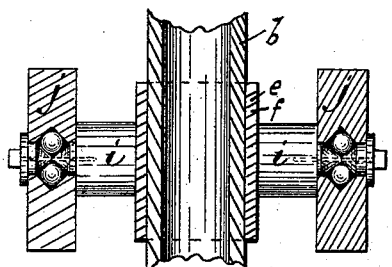
Figure 6:
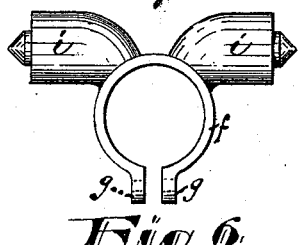
Figure 7:
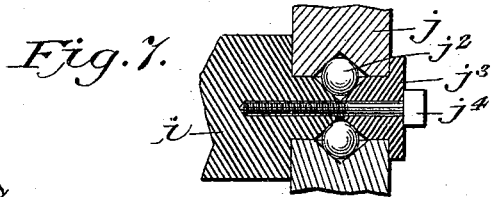

Referring to the accompanying drawings in which like letters indicate corresponding parts in each of the views, Figure 1 is a side elevation of a velocipede having my improvements. Fig. 2 is a detail section taken on line $x$, and Fig. 3 an enlarged side elevation showing the improved devices more in detail. Fig. 4 is a sectional detail taken at line $y$, Fig. 1, showing clearly the construction of a brace, bracket and gear wheels, and pedals for transmitting motion to said gear wheels. Fig. 5 illustrates, in detail section, the construction and arrangement of certain intermediate gear wheels and means for carrying the same, and Fig. 6 is a plan of the carrying means, and illustrates a modification. Fig. 7 is a sectional view illustrating, on an enlarged scale, the ball bearings for the intermediate gear wheel.

In said drawings, $a$ indicates a bicycle and $b$, $b'$, certain portions or bars of the frame thereof.

$c$ indicates the shaft which ordinarily carries the cranks or pedals, but from which said cranks have been removed and, in lieu thereof, gear or cog wheels $d$, $d$, have been fastened thereupon in any suitable manner, to receive power from co-operating gearing.

Figure 3:
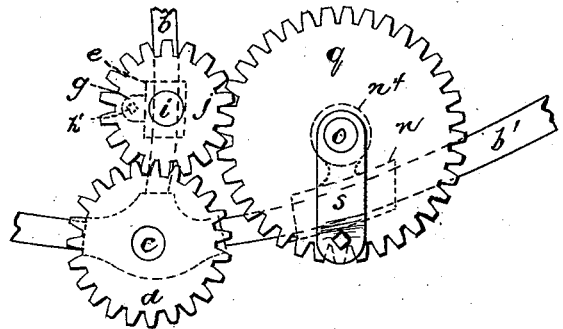

Upon the upwardly extending bar, $b$, of the vehicle frame, is arranged a bracket or bearing, $e$, shown more clearly in Figs. 3, 5 and 6, consisting of a clamping collar, $f$, with lugs, $g$, to receive a bolt and nut $h$, $h'$, by means of which the said collar is rigidly and securely fastened upon the said bar $b$, and with journals $i$ extending oppositely from said collar to receive the intermediate cog or gear wheels, $j$, which mesh with the cog wheels, $d$, on the shaft provided with the driving or sprocket wheel, $k$, for transmitting power to the vehicle wheel $l$.

The journals, $i$, have, preferably, conic extremities which co-operate with cones, $j^3$, in forming bearings for balls, $j^2$, on which latter, the wheels, $j$, revolve or rotate. Each of the said cones is provided with a shoulder for keeping its wheel, $j$, in place, and is held in proper relative position by a set screw, $j^4$, which passes through the apex of the cone into the journals $i$.

Upon the bar, $b'$, is another bracket, $m$, connected to said bar by a clamping collar, $n$, having lugs $n'$, $n'$, and a nut and bolt $n^2$, $n^3$, at one side and at the other having a tubular portion, $n^4$, through which the crank shaft, $o$, passes. Upon the bolt, $n^2$, and between the lugs, $n'$, is secured the lug, $p'$, of a brace $p$. Said brace extends upwardly or into line with the portion, $n^4$, and provides bearings for the crank shaft, $o$, space being provided between the ends of the tubular portions and the ends of the brace for gear or cog wheels, $q$, $q$, which are keyed, as at $r$, upon the crank shaft. The crank shaft at its opposite ends is provided with pedals, $s$, to receive the feet of the rider in the usual manner. Said pedals may be the ones removed from the shaft, $c$, or pedals especially provided for the purpose. The pivotal bearings for the crank shaft in the brace are preferably provided with balls, $t$, to reduce friction. The bore of the tubular portion, $n^4$, of the bracket is somewhat larger than the shaft, $o$, so that there is no material frictional contact which would tend to consume power and the arms, $p^2$, take the pressure of the cranks, the bearings of the cranks, s, on the shaft and of said shaft on said arms being very closely adjacent so that there will be little or no danger of bending the shaft or of a loose and insecure connection or arrangement of parts.

To provide bearings for the antifriction balls $t$, I prefer to form conical bearings on the shaft $o$, and co-operating bearings on the collars, $o'$, arranged on said shaft and adapted to form a V-shaped groove in which the balls work. The arms, $p^3$, are also provided with co-operating bearings for said balls. The cranks are secured on the reduced extremities of said shaft outside of said bearings.

In operating the invention, the parts being in the relation shown and described, after removing the cranks or pedals from the shaft, $c$, and the substitution of the gear wheel, $d$, therefor, the power of the rider's feet is employed in operating the crank shaft, $o$, and the gear wheels, $q$. The said power is transmitted to the small intermediate gear wheels, $j$, and from thence to the gear wheels, $d$, on the shaft with the sprocket or chain wheel, $k$, from which last, the power to the driving wheel, $l$, supporting the rider is transmitted by a chain, $u$, or other means for transmitting power.

The gear wheels being each on ball bearings, but little additional power will be required to secure largely increased speed.

Having thus described the invention, what I claim as new is—

1. The combination with a train of speeding gearing for a velocipede, of a bracket, $m$, having a collar adapted to be secured to the bicycle frame, and having a tubular portion, $n^4$, adapted to receive the crank shaft, and a brace, $p$, secured to said bracket and provided with bearings for the said crank shaft, and said crank shaft having pedals for the rider's feet, substantially as set forth.

2. In combination, in a speeding device for velocipedes, with a bracket, $m$, a brace, $p$, having arms, $p^2$, providing bearings for a crank shaft, gear wheels, $q$, arranged on said crank shaft, and said crank shaft arranged in said bearings, substantially as set forth.

3. In combination with the frame of a bicycle or velocipede a shaft, $c$, having a sprocket wheel, and having gear wheels $d$, $d$, at opposite ends thereof, a bracket attached to said frame adjacent to the shaft $c$, intermediate gear wheels, $j$, journaled on said brackets and meshing with the gear wheels $d$, $d$, and with those of the crank shaft and said crank shaft, $o$, having pedals at its opposite ends and having gear wheels $q$, $q$, thereon, the gear wheels of each pair being arranged on opposite sides of the vertical center plane of the frame, substantially as set forth.

4. In combination with a bicycle or velocipede frame having speed gearing secured thereon, a collar, $n$, also clamped upon said frame and having a tubular portion, $n^4$, a brace, $p$, having arms, $p^2$, providing bearings for the shaft $o$, and said shaft, $o$, extending through said tubular portion and carrying gearing, $q$, to cooperate with said speed gearing and pedals or cranks, $s$, for operating the machine substantially as set forth.

5. In a velocipede, the combination with the frame and speed-gearing thereof, of a collar $n$, adapted to be rigidly clamped upon the bar, $b'$, of a velocipede and having the tubular portion $n^4$, a crank shaft extending through said tubular portion gear wheels, $q$, arranged at opposite ends of said tubular portion on said crank shaft and engaging said speed gearing and a brace, $p$, attached to said collar and having arms supporting the opposite ends of the crank shaft, substantially as set forth.

6. In combination with the velocipede frame, a collar, $n$, having lips $n'$, $n'$, a brace, $p$, having a lip or lug bolted between said lips, $n'$, $n'$, and having arms, $p^2$, extending into engagement with the opposite ends of the crank shaft, and said crank shaft having speed gearing thereon, substantially as set forth.

7. In combination with shaft $c$, having sprocket wheel and means for communicating power to the wheel of the vehicle and having also a gear wheel $d$, a crank shaft bracketed upon the frame portion $b'$, and having cranks and gear-wheels thereon, a bracket clamped upon the frame portion, $b$, and carrying intermediate gear-wheels, $j$, which mesh with the crank shaft gear wheels and the gear wheels of shaft $c$, and the vehicle frame having portions $b$ and $b'$, substantially as set forth.

8. In combination with a bicycle frame and speed gearing having sprocket-wheel-shaft gear wheels $d$, $d$, and crank-shaft-gear-wheels $q$, $q$, a bracket secured to the frame and having conic journal bearings $i$, $i$, intermediate gearwheels $j$, $j$, arranged on said journal bearings, balls $j^2$, and cones, $j^3$, providing cooperating bearings for the balls and having shoulders for holding the wheels $j$ in place, and set-screws, $j^4$, all arranged and adapted to operate substantially as set forth.

In testimony that I claim the foregoing I have hereunto set my hand this 16th day of May, 1892.

CORNELIUS SULLIVAN.

Witnesses:
CHARLES H. PELL,
ALEX McKIRGAN.